United States Patent [19]
Murray

[11] Patent Number: 5,106,504
[45] Date of Patent: Apr. 21, 1992

[54] ARTIFICIAL OPEN WATER STRUCTURES

[76] Inventor: David P. Murray, 853 Wiget La., Walnut Creek, Calif. 94598

[21] Appl. No.: 654,158

[22] Filed: Feb. 12, 1991

[51] Int. Cl.⁵ ............................................... C02F 3/32
[52] U.S. Cl. .................................... 210/602; 210/747; 210/170
[58] Field of Search ............... 210/607, 747, 150, 151, 210/170, 903, 906

[56] References Cited

U.S. PATENT DOCUMENTS

| | | | |
|---|---|---|---|
| 4,169,050 | 9/1979 | Serfling et al. | 210/602 |
| 4,678,582 | 7/1987 | Lavigne | 210/602 |
| 4,855,040 | 8/1989 | Kikuth | 210/170 |

FOREIGN PATENT DOCUMENTS 58-70893  4/1983  Japan ................................. 210/602

*Primary Examiner*—Thomas Wyse
*Attorney, Agent, or Firm*—Townsend and Townsend

[57] ABSTRACT

This invention provides an artificial water impoundment system to remove biologically fixable pollutants from runoff water. The system utilizes submersed aquatic plants to absorb pollutants. The system comprises a sedimentation trench and submerged purification section elevated above the trench to maximize growth of submerged aquatic vegetation. Typically, these systems will be most valuable in processing of urban runoff or industrial waste waters.

19 Claims, 2 Drawing Sheets

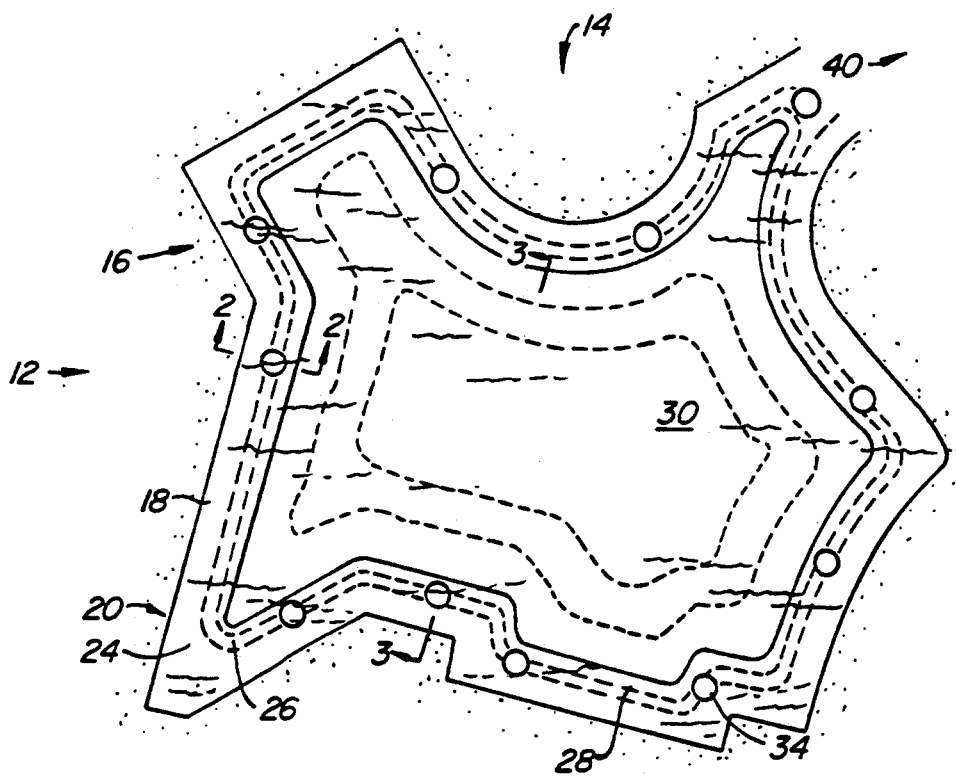
FIG._1.
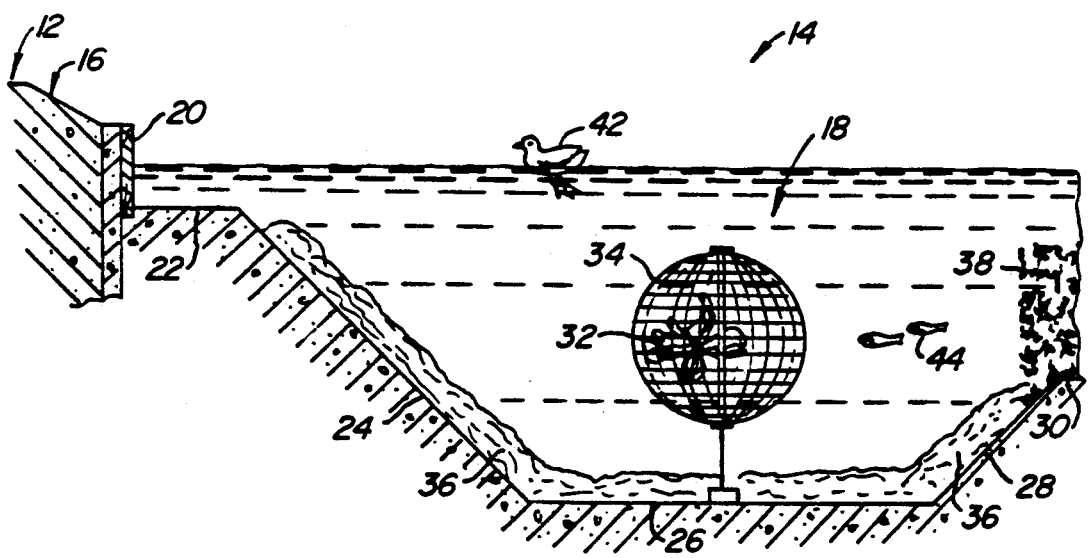
FIG._2.

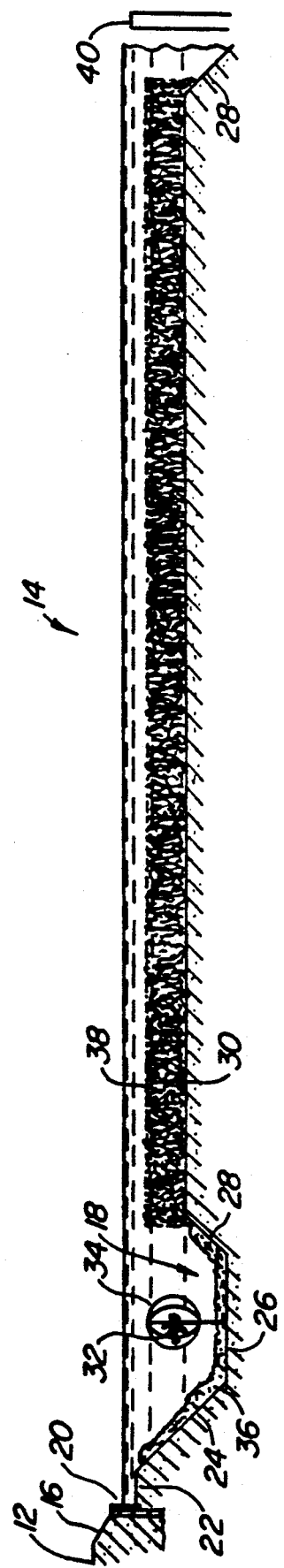
FIG._3.

ARTIFICIAL OPEN WATER STRUCTURES

BACKGROUND OF THE INVENTION

This invention provides an artificial water impoundment system to remove biologically fixable pollutants from runoff water. The system utilizes submersed aquatic plants to absorb pollutants. The system comprises a sedimentation trench and submerged purification section elevated above the trench to maximize growth of submersed aquatic vegetation. Typically, these systems will be most valuable in processing of urban runoff or industrial waste waters.

The problem of pollutants contaminating surface water from urban, residential and rural communities is well recognized. Minimum acceptable water quality standards are being enforced nationwide. Present water purifying technology is inadequate or impractical to achieve these standards. There is a demand for economically practical methods to purify surface water. This invention provides a solution to the problem.

BRIEF DESCRIPTION OF THE DRAWINGS

FIG. 1 provides an overview of the system.

FIG. 2 provides a cross-sectional view of the sedimentation trench as depicted along line 2.

FIG. 3 provides a cross-sectional view of the system as depicted along line 3.

SUMMARY OF THE INVENTION

This invention provides for a man-made or artificial water impoundment for the purification of water, especially ground water runoff contaminated by urban, industrial or agricultural pollutants. The system comprises a sedimentation trench fluidly connected to a source of polluted water and having an exterior side typically contiguous with the ground surface, a bottom, and an interior side; the interior side contiguous with a submerged purification section having a bottom elevated above the trench bottom, said section inhabited by submersed plants capable of absorbing pollutants from the water runoff; and a outflow having a height at an elevation above the submerged region.

This invention further provides for a method of purifying runoff water using the system described above.

More particularly, the system relies upon appropriate species of submersed aquatic vegetation to purify the water. These plants are selected for their ability to absorb pollutant metals and other compounds which are found in the water sources. Some of the plants are confined in permeable containers which expose the plant to the adjacent water while preventing their propagation elsewhere. Other plants grow freely in the impoundment.

The physical design of the impoundment system is optimized to facilitate maximum growth of the submersed plants and to separate new, contaminated water from old, purified water by temperature and specific gravity. To this effect, the impoundment shape and grading are designed to allow separation of water, to provide a slow flow rate past submerged aquatic vegetation, and to avoid growth of undesirable algae in the impoundment. The size and shape of the impoundment are further optimized to maximize ease and efficiency of maintenance and harvesting of the submerged aquatic vegetation, and to provide a water flow rate which allows efficient absorption of soluble constituents by submerged plants, and to minimize the growth of undesirable algae species.

Maintenance of the system includes monitoring of the pollutant constituents in the water, hydrosoil, and vegetation. Maintenance also includes periodic harvesting of the plant material.

The impoundments will have a sedimentation region, typically a trench, into which the water enters the system. The cold, dense, new runoff descends toward the bottom of the trench, and warmer, older water tends to rise towards the top. Adjacent to the sedimentation trench is a shallower submerged purification section on which is cultivated a submersed rooted aquatic vegetation bed. Typically, the bed will have different species of submersed aquatic plants in it, which will often be segregated from one another. An appropriate area of the purification region is cultivated with plants relative to the flow rate of the water over the purification region such that the residence time of the water permits the plants remove the pollution constituents to acceptably low concentrations. The flow rate of clean water out of the system will usually be controlled by a weir.

Submersed rooted aquatic vegetation are used because their physiology causes the pollutant constituents which are biologically fixed to be incorporated into adjacent plant tissue. This is in contrast to emergent aquatic plants which transport the fixed constituents into roots and other distally located plant tissue. Moreover, submersed aquatic vegetation can be easily harvested and removed while retaining a viable regenerative vegetative biomass to continue the pollution fixation process.

The volume of water necessary to be handled by the system will depend on a number of factors such as the flow rate of water through the system and the surface area of the water shed area. Seasonal variations in the flow rate will be taken into account in the design of the size and capacity of the processing system.

Other considerations in the design of the system will include water fowl habitation, fish populations, recreational potential for the body of water, and safety of users and passers by. Aesthetic considerations may also be of importance in the design of such a system.

The generalized environment and terrain will also determine the specifics of the design of the impoundment and the system. Whether the system is used in an urban or a rural setting may affect the particulars of maintenance and system design. Soil conditions may control the design and location of the system. Ease or difficulty of excavation to provide the optimum grading for the system can affect the specific sizes and shapes.

The weather patterns of the region will likely determine the necessary volume capacities and flow rates of run off associated systems. Rainfall rates, water temperatures, and sunlight will affect the rates of growth and maintenance schedules for the system.

Likewise, particular details about the incoming water will be important in considering the design of the impoundment and processing system. For example, highly polluted sources may require a longer residence time for the plants to fully absorb the pollutants. Ambient and water temperatures will affect the rates of plant metabolism and corresponding rates of biological absorption.

Details of the geography will also be considered in design of the system. For example, nearby lakes and rivers may affect where and how water may enter or exit the system. In addition, the depth of the water table may affect the depth of the system.

DESCRIPTION OF THE PREFERRED EMBODIMENTS

Referring now to FIG. 1, the system 1 or impoundment will generally receive water directly from a runoff surface 12. Alternatively, the water may be fed into the system by pipes or storm sewers which feed the water into the impoundment 1 from the runoff surface. A shore 16 is contiguous with the impoundment. Around at least part of the perimeter of the impoundment is a sedimentation trench 18 into which the runoff water is initially introduced. In an optional embodiment, the impoundment comprises a bulkhead 20 to prevent flooding as the water level rises.

In another embodiment the sedimentation trench 18 will comprise a safety shelf 22. The trench 18 is illustrated in cross section in FIG. 2, the position of the section is indicated in FIG. 1 as 2—2. Following the usual flow of water the runoff surface 12 directs the water towards the shore 16. The water then flows over or through the bulkhead 20 and falls onto a safety shelf 22. From the bulkhead 20 or the safety shelf 22 is a exterior side 24 which slopes downwards towards the bottom 26 of the sedimentation trench. Typically, the trench bottom 26 will be level. The bottom of the trench is contiguous with an interior side 28 away from the trench center on a slope. This slope will rise up to the bottom of the submerged purification section 30.

The depth of the sedimentation trench 18 should be sufficiently deep to hold the incoming volume of water for a sufficient amount of time to allow settling of the heavier water. The depth will usually be between about 8 and 20 feet, more usually between about 9 and 17 feet, typically between about 10 and 14 feet, and prefer about 12 feet. The grading of the impoundment will usually be designed to minimize the excavation necessary for producing the sedimentation trench 18; however, the depth of the trench will usually be no deeper than the water table to avoid excavation problems.

The width of the sedimentation trench 18 is not critical and is usually determined by the width of the excavation equipment. Normally, the amount of excavation will be minimized to lower costs of construction. Typically the bottom of the trench is between 10 and 15 feet in width. However, under certain circumstances, it may be desired to increase the amount of excavation for the sedimentation trench so as to provide landfill to build up the submerged plateaus or islands of the purification section 30.

The sedimentation trench 18 functions to separate the incoming water by specific gravity and temperature. The water upon first entering the impoundment 1 enters the sedimentation trench 18 and will tend to separate by specific gravity. Heavier water, either colder water or water having a high concentration of pollutant constituents, will usually have a greater specific gravity and will settle out as a heavier solution. Warmer, lighter water will tend to rise towards the top of the trench where it is exposed both to the sun and its warming effects and to the aquatic plants 32 contained within pods 34 which are suspended in the photic zone of the trench. The photic zone is that region of the impoundment that is sufficiently transparent to sunlight that maximal growth of aquatic plants will occur.

The sedimentation trench 18 into which runoff water is introduced into the impoundment 1 is at a greater depth than the center, opposite to the standard lake or impoundment design. The cold, heavy water flows into the trench and stays there for a period of time which the impoundment design has provided.

The sedimentation trench 18 is contiguous with the submerged purification section and typically shares an interior side 28 with the trench. The interior side 28 slopes from the bottom of the trench up to the bottom 30 of the submerged purification system. The submerged purification section is an elevated plateau which is above the bottom of the trench but remains below the surface of the water.

Although the system 14 illustrated in FIG. 1 has a sedimentation trench 18 substantially completely encircling the submerged purification section 30, it will be recognized that the same function can be achieved by having a sedimentation trench which is contiguous with section 30 and does not fully encircle it.

The submerged purification section 30 is depicted in FIG. 2 which shows the edge of a submerged purification section 30 and in FIG. 3, which illustrates a cross section along 3—3 of FIG. 1. The bottom of the purification section 30 is generally level and at a depth compatible with the submersed plants contained therein. The surface area of the purification section is matched to be sufficient for appropriate absorption of the amount of water flowing into the system and on the expected level of pollutants brought in with the runoff water.

The depth of the submerged section 30 is selected, in part, to be convenient for the harvesting equipment available. Presently, a 7 foot depth is preferred because harvesting equipment reaches a depth of about 6 feet thereby leaving 1 foot of submerged plant material to regenerate, grow, and absorb pollutants. Moreover, the 7 foot depth is usually still within the photic zone thereby allowing for high metabolic rates and higher water temperatures as the water flows over the submerged vegetation bed 38. Differences in depth may become advisable as different harvesting equipment is designed or manufactured and different types of plant materials are applied. In addition, as these systems are adapted to different climatic and geographic locations, the photic zones may be shallower or deeper depending on the seasonal changes and latitude of the impoundments.

Various designs for the submerged purification sections 30 may be utilized. The function of these sections is to provide a significant area through which the water flows and is subject to the biological absorption by the submerged plant mass. Thus, it is desired that the water flow be sufficiently slow that the plants may absorb a large fraction of the pollutants contained in the water. Various means for controlling water flow will be apparent to one of ordinary skill in this art.

A water exit 40 is provided and is designed so that water flows through the system at a controlled rate which provides sufficient residence time for the water to contact the submersed plants and maximize absorption of the pollutants. As previously indicated, water with the longest residence time within the impoundment is typically warmest and the most clean. Thus, it is preferred that the water exits be positioned to remove the warm top surface layer of water and be efficient at retaining water which has not stayed within the system for the desired amount of time. The rate of water flow at various times throughout the year and the parameters involved in biological absorption of the pollutants can be determined by assaying the water for pollutants using well known assays in the art.

A weir having a wall as a water escape entrance is preferred as an water exit. The weir may be controllable with respect to its wall height or its width or other parameter which controls the water flow rate over the wall. Alternatively, a downpipe (glory hole) or series of downpipes having adjustable heights could be placed in the purification section 30 to collect surface water and exit that water from the system. Downpipes stand vertical and are set so that the pipes' entrances are above the bottom of the purification section (30). Thus, these pipes are able to selectively convey warm surface water at its entrance from the system.

A computer program can be used to calculate the minimum size for a purification system (retention basin) to fully treat runoff waters from a given watershed. For this purpose, a computerized "spreadsheet" program may be used, such as Lotus 1-2-3 from Lotus Development Corporation, or VP-Planner from Paperback Software.

An appropriate input of data and formulas for a spreadsheet program is provided herewith as Appendix A, and the resulting spreadsheet display is provided herewith as Appendix B. It will be understood, however, that the calculation of retention basin size could be performed using other methods, based on the following description of the calculations performed by the spreadsheet program.

The spreadsheet accepts user input of the acreage of each category of land use within the watershed (excluding lake surface acreage) and the typical local rainfall data (for average storms, mean annual storm, 10 year storm, and seasonal total). The spreadsheet program contains runoff coefficients for each of the categories of land use, which may be adjusted as appropriate for local conditions. The program also contains typical mean concentrations of trace metals found in urban runoff waters, for each of the categories of land use. This data is available from Nationwide Urban Runoff Studies and can be updated as newer data becomes available.

A weighted average concentration is calculated for each of the trace metals, using the land use acreage, the runoff coefficients, and the trace metal mean concentration data. For each trace metal, the weighted average concentration C of the metal in water entering the system or basin from all sources is:

$$C = \frac{\Sigma_i A_i * R_i * C_i}{1.05 * D}$$

where
$A_i$ = Acreage of land use type i;
$R_i$ = Runoff coefficient of land use type i;
$C_i$ = Mean concentration of this trace metal for land use type i; and
D = Average runoff coefficient =

$$\frac{\Sigma_i A_i * R_i}{\Sigma_i A_i}$$

These weighted average concentrations are used to calculate inflow loads of trace metals projected to enter the basin each season. The inflow load L for each trace metal is:

$$L = C * 1.23 * RV$$

where

C = Weighted average concentration of the trace metal; and
RV = Seasonal runoff volume in acre-feet calculated from the seasonal rainfall in inches and is equal to: Seasonal rainfall (feet) * Average runoff coefficient; where 1.23 is conversion factor (mg/L to Kg/acre-ft).

The expected concentration P of trace metals in plants is calculated for each trace metal by the formula:

$$P = C * 10^{H + \log(C) * I}$$

where
C = Weighted average concentration of the trace metal in runoff water; and
H and I = Constants for the trace metal.

The constants and the equation were derived empirically from available data describing the statistical relationship between concentration of metals in water and concentration of metals in plants. The constants H and I for each metal in this embodiment are given in columns H and I of the spreadsheet display of Appendix B, at rows 53–58.

The resulting plant concentrations and the corresponding inflow loads for each trace metal are then used to calculate the total surface area A required to contain a sufficient amount of biomass to absorb the calculated load of trace metals, based on a density of 3 kg/m² of stand area:

$$A = \frac{L}{.0145 * P * 2}$$

where
L = Inflow load for the trace metal; and
P = Concentration of the metal in plants; 0.145 is a conversion factor (mg/kg to kg/acre).

The largest value of A provides the minimum surface area required for a retention basin for full removal of the trace minerals from the watershed. It should be noted that A represents the surface area of the plateau or submerged purification section 30. The sedimentation trench 18 is in addition to this area.

Various plants may be incorporated in the impoundments of the present invention. The selection of plants will depend upon the local climate. The selection of suitable plants is within the routine skill of a water biologist familiar with a particular locale. Typically, one selects species with a sufficient growth rate to ensure adequate absorption of pollutants.

The sedimentation trenches 18 typically will have at least two different types of submersed plants within them. The first type is those contained within the submersible pods 34. The pods are usually porous allowing for passage of soluble and suspended nutrients and pollutants to reach the enclosed plants but with small enough meshes to entrap the submerged plants and localize them for ease of maintenance and harvesting. See Murray, U.S. Pat. No. 4,888,912, which is hereby incorporated herein by reference. The pods are also suspended at an appropriate height so as to maximize metabolic rate. The depth of each pod is adjusted to balance the temperature and light so as to optimize biological absorption by the plants contained therein. Plants of the genus *Ceratophyllum* are preferred for introduction into these pods. The species *C. demersun* and *C. echinatum* are the preferred species for temperate climates. Other species may be better suited under other climatic conditions.

A second group of plants 36 may be attached on the trench bottom 26. These plants will preferably be of the genus Eleocharis. Preferred species are *E. coloradoensis* and *E. acicularis*. Other species may be utilized, if better adapted to the local conditions.

Various different types of submersed, rooted plants may be cultivated on the bottom of purification section 30. It is preferable that the selected plants have a physiology which absorbs and transports pollutant constituents from the hydrosoil up into the tissues above the hydrosoil. Unlike emergent aquatic plants, the nutrients and pollutants absorbed by submersed, rooted plants are not transported to roots or adjacent soils. Thus, harvesting equipment which removes plant material will remove the absorbed nutrients and pollutants. The purification sections 30 will typically contain multiple submersed plant species. The selected combination of plant species will usually depend upon the composition of the inflowing water. For example, water containing many nitrates or phosphates may be treated by species or genetic variants of species which have been selected for their high efficiency conversion of nitrates or phosphates. Although the various species of submersed plants may be intermixed, it will usually be preferred to keep the species separated from each other. This provides of easier management in modifying the proportions of various species and harvesting of specific species relative to others.

Three genera are preferred, *Elodea, Myriophyllum*, and *Potamogeton*. The preferred species of Elodea are *E. canadensis* and *E. densa*. The preferred *Myriophyllum* species are *M. exalvescens* and *M. hippurioids*. Preferred species of *Potamogeton* are *P. zosteriformis* and *P. tectinatus*. These genera are found worldwide and suitable species are available for virtually any climate.

In another embodiment, the submersed rooted plants described above can be cultivated in the sediment trench (18) as well as the purification section (30).

Impoundments of the disclosed design may be made either by dry excavation or, alternatively, by dredging an existing body of water. Typically, dry excavation may be easier but dredging may be preferred where the body of water is easily convertible into the correct configuration.

The bottom of the impoundment is preferably lined or surfaced with an appropriate medium to prevent contact between the runoff water with the ground water. A natural impermeable clay lining is preferred under circumstances where permit.

Although not generally needed, where desired, one can use a commercial aerator such as a Roots Blower system to circulate and oxygenate the water in the system.

Once a system as disclosed herein is constructed the maintenance of the system is very important. The primary require maintenance operation is regularly scheduled harvesting of the aquatic plants. It is this step which actually removes the absorbed pollution constituents from the aquatic system. If the plants are allowed to die and decompose within the impoundment, absorbed nutrients and trace metals will be released back into the water.

Harvesting should be performed at least twice each year—once in late spring of early summer, at the time of peak plant growth. Levels of absorbed constituents within the plants are highest at this time. A second harvest should be performed in fall, before plants begin to die back for the winter. This harvest should be completed before the water temperature drops below 60° F. Additional harvests may be optionally performed during the summer if excess plant growth interferes with aesthetic or recreational values of the impoundment.

In geographic areas where there is an extended dry season, such as in California, it is important that the impoundment not be allowed to dry out completely. Preferably, additional water should be added to maintain a constant surface level year-round. If the impoundment is not additionally serving aesthetic or recreational purposes, some lowering of the water level during the dry season is acceptable, but a water depth of at least four feet must be maintained over the purification section 30. If this depth is not maintained, invasion of the impoundment by emergent plant species such as cattail (*Typha latifolia*) and bulrush (*Scirpus acutus*) will reduce the effectiveness of the system.

Besides direct vegetation maintenance, many aspects of ecological control will affect plant health. For example, flow rates of water through the system will be very important in determining residence time within the system and therefore the level of bioabsorption which occurs. The quality of water exiting the system will depend on the flow rate and pollution level of the influx water. Moreover, the nutrient levels may be very dependent on the levels of non-plant organisms which populate the ecosystem. Excess numbers of resident water fowl 42 may affect the levels of natural pollutants and may negatively affect the viability and health of the cultivated plants.

Monitoring the fluxes of bioabsorption, input, and exit of various compounds are helpful in scheduling times of maintenance throughout a season or seasonal cycle. For example, the procedures for harvesting and maintenance of the system will be very different in cold winters as compared to hot summers. Plant bioabsorption rates may be different in the summer than in the winter, due in part to temperature and photic zone differences. Likewise, the flow rates of water may be varied with the seasons, especially as rainfall enters the system. Plant growth and maintenance for different species in different regions of the impoundment may depend upon seasonal variations or year to year weather or other variations. Although typically, the surface area of cultivation for particular species may differ from season to season, minimization of maintenance concerns may lead to a ratio of surface areas which average out over the year to be optimal. With maintenance of records and monitoring of a particular impoundment over a number of years, algorithms for determining the dates and types of maintenance may be predicted with accuracy which may allow for economical maintenance of the system.

In general, the maintenance of the system is left to trained personnel with experience in limnology or aquatic biology. The mechanics of maintenance is similar to maintaining sewage lagoons, reservoirs and other artificial lakes. The system is typically monitored in two or three locations. At least one of the locations should be about one foot from the bottom of the deepest point of the system. Samples are monitored for a variety of different parameters. The following details the parameters, the desired ranges and typical responses if the parameters are outside the desired ranges. The frequency of monitoring these parameters will vary with conditions. A typical monitoring schedule is presented in table 1.

The pH of the system should be maintained between approximately 6.9 to 8.7. When the pH drops below 6.9 or rises above 8.7 appropriate steps should be taken to correct it, to bring the pH back into the acceptable range. For example, the limnologist should identify the cause as either short term or persistent. The rate of loss of available carbonates should be determined. One should consider whether the addition of hydrated lime or sodium sesquicarbonate should be added to the lake. When the lake is excessively alkaline, one should consider providing alternative sources of water. When total alkalinity (as calcium carbonate) is present in less than 75 parts per million, one should consider the addition of hydrated lime or sodium sesquicarbonate.

The temperature of the system will vary according to the seasons. When the lake is below 60° F. one may consider the possibility of harvesting the plant crop. When the temperature is in excess of 80° F., the limnologist should be watching for signs of potential algal blooms. The frequency of nutrient testings for nitrate and phosphate concentrations should be increased.

The dissolved oxygen ("D.O.") should be maintained at at least 80% saturation. When the D.O. is less than 70% of saturation in the deep samples, it may be necessary to harvest the plants. It may also be necessary to seek the source causing the drop in the D.O. When low dissolved oxygen levels are persistent, means for aerating the water may be helpful. Such devices are commercially available.

Tables 2, 3, and 4 provide a typical maintenance schedule. Those of skill will recognize that environmental conditions will vary and adjustments to this schedule may need to be made to reflect local conditions.

TABLE 1

Water Quality Monitoring Frequencies

| | FREQUENCY | | |
|---|---|---|---|
| | Lake | Mitigation Monitoring | |
| PARAMETER | Management | Outlet | Inflow |
| Water | | | |
| level | C | C | E |
| pH | W | F | F |
| alkalinity (available carbonates) | W | | |
| temperature* | W | F | F |
| dissolved oxygen* | W (June-Oct.) M (Nov.-May) | | |
| nitrate-nitrogen | W | Q | F |
| ammonia-nitrogen | | Q | F |
| phosphate-phosphorous | W | | |
| total phosphorous | Q | F | F |
| turbidity | M | F | F |
| total suspended solids | | F | F |
| chlorophylla | M | | |
| electrical conductivity | M | F | F |
| oil and grease | M | M | F |
| fecal coliform | M | | |
| $BOD_5$ | Q | | |
| Metals | | | |
| Arsenic | S | Q | F |
| Cadmium | S | Q | F |
| Chromium | S | Q | F |
| Copper | S | Q | F |
| Lead | S | Q | F |
| Mercury | S | Q | F |
| Zinc | S | Q | F |
| 3 species toxicity test | | A | |
| Vegetation | | | |
| Metals (same as for water) | Q | A | |
| Sediment | | | |

TABLE 1-continued

Water Quality Monitoring Frequencies

| | FREQUENCY | | |
|---|---|---|---|
| | Lake | Mitigation Monitoring | |
| PARAMETER | Management | Outlet | Inflow |
| Metals (same as for water) | A | A | |
| Phosphate-Phosphorous | A | A | |

*Temperature and dissolved oxygen readings shall be taken both at the surface and near the bottom of the lake from June through October.
Surface samples are sufficient in other months.
Frequency codes:
A = Annually
C = Continuous recording
E = Once per storm event, as near to peak runoff as possible
F = Several times per storm, consolidated as a composite sample
M = Monthly
Q = Quarterly
S = Semi-annually
W = Weekly

TABLE 2

Water Quality Objectives and Responses to Unacceptable Quality

| Parameter | Objective | Level Requiring Response | Response |
|---|---|---|---|
| pH | 6.9–8.7 | below 6.9 | Identify cause as either short term or persistent Calculate rate of loss of available carbonates Consider addition of hydrated lime or sodium sesquicarbonate Take appropriate action to eliminate source or compensate for carbonate loss |
| | | Above 8.7 | Calculate rate of increase over time Locate, and if possible, eliminate source Provide alternate or acceptable source of water |
| Alkalinity (as $CaCO_3$) | greater than 100 ppm | below 75 ppm | Consider addition of hydrated lime or sodium sesquicarbonate |
| Hardness (as $CaCO_3$) | up to 200 mg/l | If reduced levels result in violation of trace metal toxicity levels | Add hydrated lime. |
| Temperature | Varies seasonally | below 60° F. | Schedule Fall harvest when temperature drops below this level |
| | | above 80° F. | Watch for signs of potential algae blooms; increase frequency of nutrient testing if nitrate or phosphate concentrations approach critical levels |
| Dissolved Oxygen (D.O.) | at least 80% saturation | less than 70% saturation in deep sample | Increase hours of recirculation and/or aeration Seek source causing drop in D.O.; if due to excess plant growth, harvest plants |

TABLE 3

Water Quality Objectives and Responses to Unacceptable Quality

| Parameter | Objective | Level Requiring Response | Response |
|---|---|---|---|
| Nitrate-Nitrogen | below 0.2 ppm | 0.2 ppm or greater | Locate source(s): Examine irrigation and fertilizing schedules for compliance with guidelines of this plan Consider any other possible sources Take appropriate action to eliminate sources |
| Phosphate-Phosphorus | below 0.02 ppm | 0.02 ppm or greater | Locate source(s): Examine irrigation and fertilizing schedules for compliance with guidelines of this plan Consider any other possible sources Take appropriate action to eliminate sources Anticipate algai bloom; take appropriate action |
| Turbidity | secchi disk reading no less than 5 feet | secchi disk reading less than 5 feet | Idenitfy sources of sediment Check for sediment accumulation around pump intakes Check for erosion of landscaped areas around perimeter Eliminate sources |
| Chlorophyll a | less than 10 ug/l | greater than 10 ug/l | Check temperature and nutrient levels to identify cause of algae growth Take corrective action to eliminate cause |
| Electrical conductivity | less than 700 umhos/cm | greater than 900 umhos/cm | If high levels are reached before Sept. 15 in any given year, add sufficient additional well water to prevent further increase |

TABLE 4

Water Quality Objectives and Responses to Unacceptable Quality

| Parameter | Objective | Level Requiring Response | Response |
|---|---|---|---|
| Oil and grease | less than 15 mg/l | above 15 mg/l. | Locate source; prevent any remaining reservoirs from entering lake Identify the reason for the source having been created Take appropriate action to prevent recurrence If concentrations threaten escape to drains, isolate lake to protect downstream environments If concentrations are so large as to present danger to migratory birds or cause extensive damage to indigenous organisms, contact RWQCB and/or Fish and Game for assistance Post notices prohibiting water contact recreation Identify source, take corrective action |
| Fecal coliform | less than 200/100 ml | above 200 mg/l | |
| BOD$_5$ | below 20 mg/l. | above 20 mg/l. | Determine source of oxygen demand (e.g., chemical, organic debris, excessive algai bloom, etc.) Increase aeration/circulation cycle Take appropriate action to reduce organic loading |
| Metals-Vegetation | Meet Title 22 hazardous waste standards (see appendix C) | over ½ Title 22 hazardous waste standards | Harvest vegetation before critical levels exceeded. |
| Metals-Sediment | Avoid accumulation | Yearly increase in levels | Adjust vegetation management program to increase extration. |

|   | A | B | C | D | E | F | G |
|---|---|---|---|---|---|---|---|
| 1 | Vegetative Management System for Treatment of Urban Runoff Water |
| 2 | | Copyright 1990, Micron Systems, Inc. |
| 3 | | | | | | | |
| 4 | Treament Pond Dimension Calculator |
| 5 | | | | | | | |
| 6 | Project: | Sample Lake | | | | | |
| 7 | | | | | | | |
| 8 | Land use: | Acres | Runoff | | Rainfall: | | |
| 9 | (type) | | Coeff. | | Av.Storm: | .5 inches | |
| 10 | Open | 10 | .1 | | MAS: | 2.3 inches | |
| 11 | Res < 1/ac): | 25 | .1 | | 10 Year: | 4.6 inches | |
| 12 | Res-Single | 25 | .2 | | Season: | 18.0 inches | |
| 13 | Res-Mult | 5 | .4 | | | | |
| 14 | Bus/Com | 5 | .5 | | | | |
| 15 | Hvy Indst | 2 | .8 | | | | |
| 16 | Total | 72 | | | | | |
| 17 | | | | | | | |
| 18 | | | | | | | |
| 19 | Minimum Lake Dimensions: | | | Surface: | 2.9 acres | | |
| 20 | | | | | | | |
| 21 | | | | | | | |
| 22 | Mean Concentration of Metals |
| 23 | in Winter Runoff Waters (mg/l): |
| 24 | | | | | | | |
| 25 | | Open | Resid/ | Heavy | Weighted | | |
| 26 | | Space | Comm. | Indust | Average | | |
| 27 | Cadmium | .0006 | .0017 | .0059 | .0020 | | |
| 28 | Chromium | .0040 | .0157 | .0310 | .0158 | | |
| 29 | Copper | .0090 | .0450 | .0605 | .0421 | | |
| 30 | Lead | .0040 | .0608 | .1100 | .0593 | | |
| 31 | Nickel | .0184 | .0226 | .0395 | .0230 | | |
| 32 | Zinc | .0100 | .1738 | .9950 | .2405 | | |
| 33 | | | | | | | |
| 34 | | | | | | | |
| 35 | Seasonal Runoff volume: | | | 21.9000 acre-feet | | | |
| 36 | | | | | | | |
| 37 | | Inflow | Inflow | | | | |
| 38 | | conc. | Load | | | | |
| 39 | | (mg/l) | (kg) | | | | |
| 40 | Cadmium | .0020 | .1 | | | | |
| 41 | Chromium | .0158 | .4 | | | | |
| 42 | Copper | .0421 | 1.1 | | | | |
| 43 | Lead | .0593 | 1.6 | | | | |
| 44 | Nickel | .0230 | .6 | | | | |
| 45 | Zinc | .2405 | 6.5 | | | | |
| 46 | | | | | | | |

APPENDIX A

|   | A | B | C | D | E | F | G |
|---|---|---|---|---|---|---|---|
| 46 |   |   |   |   |   |   |   |
| 47 |   |   |   |   |   |   |   |
| 48 | Acreage required for full removal |   |   |   |   |   |   |
| 49 |   |   |   |   |   |   |   |
| 50 |   | Winter | Plant | Acres |   |   |   |
| 51 |   | Load | Conc. | Required |   |   |   |
| 52 |   | (kg) | (mg/kg) |   |   |   |   |
| 53 | Cadmium | .1 | 7 | .3 |   |   |   |
| 54 | Chromium | .4 | 8 | 1.9 |   |   |   |
| 55 | Copper | 1.1 | 22 | 1.8 |   |   |   |
| 56 | Lead | 1.6 | 60 | .9 |   |   |   |
| 57 | Nickel | .6 | 11 | 1.9 |   |   |   |
| 58 | Zinc | 6.5 | 77 | 2.9 |   |   |   |
| 59 |   |   |   |   |   |   |   |
| 60 |   |   |   |   |   |   |   |

|   | F | G | H | I | J | K | L |
|---|---|---|---|---|---|---|---|
| 51 |   |   |   |   |   |   |   |
| 52 | Plant content calculator: |   |   |   |   |   |   |
| 53 | .0019856 | -2.7021 | 2.89 | -.24 | 3.538503 | 6.861292 |   |
| 54 | .015786 | -1.80173 | .57 | -1.17 | 2.67802 | 7.521311 |   |
| 55 | .0421265 | -1.37544 | 1.61 | -.81 | 2.72411 | 22.31853 |   |
| 56 | .0593346 | -1.22669 | 2.07 | -.76 | 3.002286 | 59.64774 |   |
| 57 | .0230137 | -1.63801 | 1.25 | -.88 | 2.691452 | 11.30937 |   |
| 58 | .2405479 | -.618798 | 1.9 | -.98 | 2.506422 | 77.2012 |   |
| 59 |   |   |   |   |   |   |   |

A1 'Vegetative Management System
A2
A3
A4 'Treament Pond Dimension Calculator
A5
A6 'Project:
A7
A8 'Land use:
A9 '(type)
A10 'Open
A11 'Res < 1/ac):
A12 'Res-Single
A13 'Res-Mult
A14 'Bus/Com
A15 'Hvy Indst
A16 'Total
A17
A18
A19 'Minimum Lake Dimensions:
A20
A21
A22 'Mean Concentration of Metals
A23 'in Winter Runoff Waters (mg/l):
A24
A25
A26
A27 'Cadmium
A28 'Chromium
A29 'Copper
A30 'Lead A31'Nickel
A32'Zinc
A33
A34
A35'Seasonal Runoff volume:
A36
A37
A38
A39
A40'Cadmium
A41'Chromium
A42'Copper
A43'Lead
A44'Nickel
A45'Zinc
A46
A47
A48'Acreage required for full removal
A49
A50
A51
A52
A53'Cadmium
A54'Chromium
A55'Copper
A56'Lead
A57'Nickel
A58'Zinc

APPENDIX B

B1
B2'Copyright 1990, Micron Systems, Inc.
B3
B4
B5
B6'Sample Lake
B7
B8"Acres
B9
B10 U 10
B11 U 25
B12 U 25
B13 U 5
B14 U 5
B15 U 2
B16 @IF(@SUM(B10..B15)>0,@SUM(B10..B15),@NA)
B17
B18
B19
B20
B21
B22
B23
B24
B25"Open

```
B26"Space
B27(F4) .0006
B28(F4) .004
B29(F4) .009
B30(F4) .004
B31(F4) .0184
B32(F4) .01
B33
B34
B35
B36
B37"Inflow
B38"conc.
B39"(mg/l)
B40(E4) +E27
B41(E4) +E28
B42(E4) +E29
B43(E4) +E30
B44(E4) +E31
B45(E4) +E32
B46
B47
B48
B49
B50"Winter
B51"Load
B52"(kg)
B53(C1) +C40
B54(C1) +C41
B55(C1) +C42
B56(C1) +C43
B57(C1) +C44
B58(C1) +C45
C1
C2
C3
C4
C5
C6
C7
C8"Runoff
C9"Coeff.
C10 .1
C11 .1
C12 .2
C13 .4
C14 .5
C15 .8
C16
C17
C18
C19
C20
C21
C22
C23
C24
```

```
C25"Resid/
C26"Comm.
C27(F4)  .0017
C28(F4)  .0157
C29(F4)  .045
C30(F4)  .0608
C31(F4)  .0226
C32(F4)  .1738
C33
C34
C35
C36
C37"Inflow
C38"Load
C39"(kg)
C40(B1)  +B40*1.23*D$35
C41(B1)  +B41*1.23*D$35
C42(B1)  +B42*1.23*D$35
C43(B1)  +B43*1.23*D$35
C44(B1)  +B44*1.23*D$35
C45(B1)  +B45*1.23*D$35
C46
C47
C48
C49
C50"Plant
C51"Conc.
C52"(mg/kg)
C53(K0)  +K53
C54(K0)  +K54
C55(K0)  +K55
C56(K0)  +K56
C57(K0)  +K57
C58(K0)  +K58
D1'for Treatment of Urban Runoff Water
D2
D3
D4
D5
D6
D7
D8
D9
D10(H)
D11(H)
D12(H)
D13(H)
D14(H)
D15(H)
D16(H)
D17
D18
D19'Surface:
D20'Volume:
D21
D22
```

```
D23
D24
D25"Heavy
D26"Indust
D27(F4)  .0059
D28(F4)  .031
D29(F4)  .0605
D30(F4)  .11
D31(F4)  .0395
D32(F4)  .995
D33
D34
D35(F4)  (F12/12)*D$16
D36
D37
D38
D39
D40(F1)
D41(F1)
D42(F1)
D43(F1)
D44(F1)
D45(F1)
D46(F1)
D47(F1)
D48
D49
D50"Acres
D51"Required
D52
D53(B1)  +B53/(.0145*C53*2)
D54(B1)  +B54/(.0145*C54*2)
D55(B1)  +B55/(.0145*C55*2)
D56(B1)  +B56/(.0145*C56*2)
D57(B1)  +B57/(.0145*C57*2)
D58(B1)  +B58/(.0145*C58*2)
E1
E2
E3
E4
E5
E6
E7
E8'Rainfall:
E9'Av.Storm:
E10'MAS:
E11'10 Year:
E12'Season:
E13
E14
E15'Hardness:
E16
E17
E18
E19(D1)  @MAX(D53..D58)
E20(F1)  @MAX(F70..F75)*C63
E21
E22
E23
E24
E25"Weighted
E26"Average
```

| | |
|---|---|
| E27(B4) | (B$10*C$10*B27+(B$11*C$11+B$12*C$12+B$13*C$13+B$14*C$14)*C27+B$15*C$15*D27)/(D$16*1.05 |
| E28(B4) | (B$10*C$10*B28+(B$11*C$11+B$12*C$12+B$13*C$13+B$14*C$14)*C28+B$15*C$15*D28)/(D$16*1.05 |
| E29(B4) | (B$10*C$10*B29+(B$11*C$11+B$12*C$12+B$13*C$13+B$14*C$14)*C29+B$15*C$15*D29)/(D$16*1.05 |
| E30(B4) | (B$10*C$10*B30+(B$11*C$11+B$12*C$12+B$13*C$13+B$14*C$14)*C30+B$15*C$15*D30)/(D$16*1.05 |
| E31(B4) | (B$10*C$10*B31+(B$11*C$11+B$12*C$12+B$13*C$13+B$14*C$14)*C31+B$15*C$15*D31)/(D$16*1.05 |
| E32(B4) | (B$10*C$10*B32+(B$11*C$11+B$12*C$12+B$13*C$13+B$14*C$14)*C32+B$15*C$15*D32)/(D$16*1.05 |

E33 .
E34
E35 'acre-feet
E36
E37
E38
E39
E40(F1)
E41(F1)
E42(F1)
E43(F1)
E44(F1)
E45(F1)
E46(F1)
E47(F1)
E48
E49
E50
E51
E52
E53
E54
E55
E56
E57
E58
F1
F2
F3
F4
F5
F6
F7
F8
F9(F1) U .5
F10(F1) U 2.3
F11(F1) +F10*2
F12(F1) U 18
F13
F14
F15 U 200
F16
F17
F18
F19 'acres
F20 'acre-feet
F21
F22
F23
F24
F25
F26
F27
F28
F29
F30
F31

```
F32
F33
F34
F35
F36
F37
F38
F39
F40(F4)
F41(F4)
F42(F4)
F43(F4)
F44(F4)
F45(F4)
F46(F4)
F47(F4)
F48
F49
F50
F51
F52'Plant content calculator:
F53 +E27
F54 +E28
F55 +E29
F56 +E30
F57 +E31
F58 +E32
G1
G2
G3
G4
G5
G6
G7
G8
G9'inches
G10'inches
G11'inches
G12'inches
G13
G14
G15'mg/l CaCO3
G16
G17
G18
G19
G20
G21
G22
G23
G24
G25
G26
G27
G28
G29
```

G30
G31
G32
G33
G34
G35
G36
G37
G38
G39
G40
G41
G42
G43
G44
G45
G46
G47
G48
G49
G50
G51
G52
G53 @LOG(F53)
G54 @LOG(F54)
G55 @LOG(F55)
G56 @LOG(F56)
G57 @LOG(F57)
G58 @LOG(F58)
H1
H2
H3
H4
H5
H6
H7
H8
H9
H10
H11
H12
H13
H14
H15
H16
H17
H18
H19
H20
H21
H22
H23
H24
H25
H26
H27

H28
H29
H30
H31
H32
H33
H34
H35
H36
H37
H38
H39
H40
H41
H42
H43
H44
H45
H46
H47
H48
H49
H50
H51
H52
H53 2.89
H54 .57
H55 1.61
H56 2.07
H57 1.25
H58 1.9
I1
I2
I3
I4
I5
I6
I7
I8
I9
I10
I11
I12
I13
I14
I15
I16
I17
I18
I19
I20
I21
I22
I23
I24
I25
I26

I27
I28
I29
I30
I31
I32
I33
I34
I35
I36
I37
I38
I39
I40
I41
I42
I43
I44
I45
I46
I47
I48
I49
I50
I51
I52
I53 -.24
I54 -1.17
I55 -.81
I56 -.76
I57 -.88
I58 -.98
J1
J2
J3
J4
J5
J6
J7
J8
J9
J10
J11
J12
J13
J14
J15
J16
J17
J18
J19
J20
J21
J22
J23
J24
J25

```
J26
J27
J28
J29
J30
J31
J32
J33
J34
J35
J36
J37
J38
J39
J40
J41
J42
J43
J44
J45
J46
J47
J48
J49
J50
J51
J52
J53  +H53+G53*I53
J54  +H54+G54*I54
J55  +H55+G55*I55
J56  +H56+G56*I56
J57  +H57+G57*I57
J58  +H58+G58*I58
K1
K2
K3
K4
K5
K6
K7
K8
K9
K10
K11
K12
K13
K14
K15
K16
K17
K18
K19
K20
K21
K22
K23
```

K24
K25
K26
K27
K28
K29
K30
K31
K32
K33
K34
K35
K36
K37
K38
K39
K40
K41
K42
K43
K44
K45
K46
K47
K48
K49
K50
K51
K52
K53 @IF(@ISERR(F53*10^J53),0,F53*10^J53)
K54 @IF(@ISERR(F54*10^J54),0,F54*10^J54)
K55 @IF(@ISERR(F55*10^J55),0,F55*10^J55)
K56 @IF(@ISERR(F56*10^J56),0,F56*10^J56)
K57 @IF(@ISERR(F57*10^J57),0,F57*10^J57)
K58 @IF(@ISERR(F58*10^J58),0,F58*10^J58)

What is claimed is:

1. A system for purifying contaminated water comprising:
   a source of the contaminated water;
   a sedimentation trench fluidly connected to the source of contaminated water, the trench having a bottom, an exterior side, and an interior side;
   a submerged purification section contiguous with the interior side and having a bottom elevated above the trench bottom, said submerged section inhabited by cultivated, submersed, rooted plants capable of absorbing water contaminants; and,
   a water exit in contact with the water, said exit having a height at an elevation above the bottom of the submerged purification section.

2. A system of claim 1, wherein said bottom of said sedimentation trench is at a depth of between about 18 and 20 feet.

3. A system of claim 1, wherein said sedimentation trench is inhabited by a submersed cultivated plant capable of absorbing nitrate or phosphate salts from said runoff water, said plant enclosed within a phytocompatible envelope.

4. A system of claim 3, wherein said submersed plant is from a genus selected from the group consisting of *Ceratophyllum, Elodea, Myriophyllum, Najas, Vallisneria* and *Potamogeton*.

5. A system of claim 1, wherein said sedimentation section has a sloping side of less than a 3 to 1 slope.

6. A system of claim 1, wherein said submerged region has a depth between about 6 to about 10 feet.

7. A system of claim 1, wherein said submersed plants comprise at least one species selected from the genre consisting of *Ceratophyllum, Elodea, Myriophyllum, Najas, Vallisneria* and *Potamogeton*.

8. A system of claim 1, further comprising a pump having an inlet and outlet connected to a water source separate from the water of the system and the outlet connected to the water in the system.

9. A system of claim 1, wherein the trench encircles the submerged purification section.

10. A system of claim 1, wherein said water exit adjusts to control water flow.

11. A system of claim 1 wherein said water exit is a weir.

12. A system of claim 1 wherein said water exit is a downpipe.

13. A method of purifying water comprising:
the separating of water and particulates by specific gravity in a sedimentation trench having an exterior side, a bottom and an interior side;
passing water across a bed of cultivated submersed rooted plants at a controlled flow rate in a submerged purification section contiguous with the interior side of the sedimentation trench and having a bottom elevated above the sedimentation trench bottom, said cultivated submersed rooted plants capable of absorbing water pollutants;
and exiting the water through a water exit in contact with the water, said exit having a water entrance at an elevation above the bottom of the submerged purification section.

14. A method of claim 11 wherein the water exits from a weir.

15. A method of claim 13, wherein the bottom of the sedimentation trench is at a depth of between about 8 to about 20 feet.

16. A method of claim 13, wherein said sedimentation trench is inhabited by a submersed cultivated plant capable of absorbing nitrate or phosphate salt from said runoff water, said plant enclosed within a phytocompatible envelope.

17. A method of claim 16, wherein said submersed plant is from a genus selected from the group consisting of *Ceratophyllum, Elodea, Myriophyllum, Najas, Vallisneria* and *Potamogeton*.

18. A method of claim 13, wherein said submerged purification section has a depth between about 6 to about 10 feet.

19. A method of claim 13, wherein said submersed plants comprise at least one species selected from the group consisting of members of the genus *Ceratophyllum, Elodea, Myriophyllum, Najas, Vallisneria* and *Potamogeton*.

* * * * *